Sept. 20, 1932. G. E. HAZARD 1,878,515
TIRE SPREADER
Filed Jan. 9, 1928 2 Sheets-Sheet 1
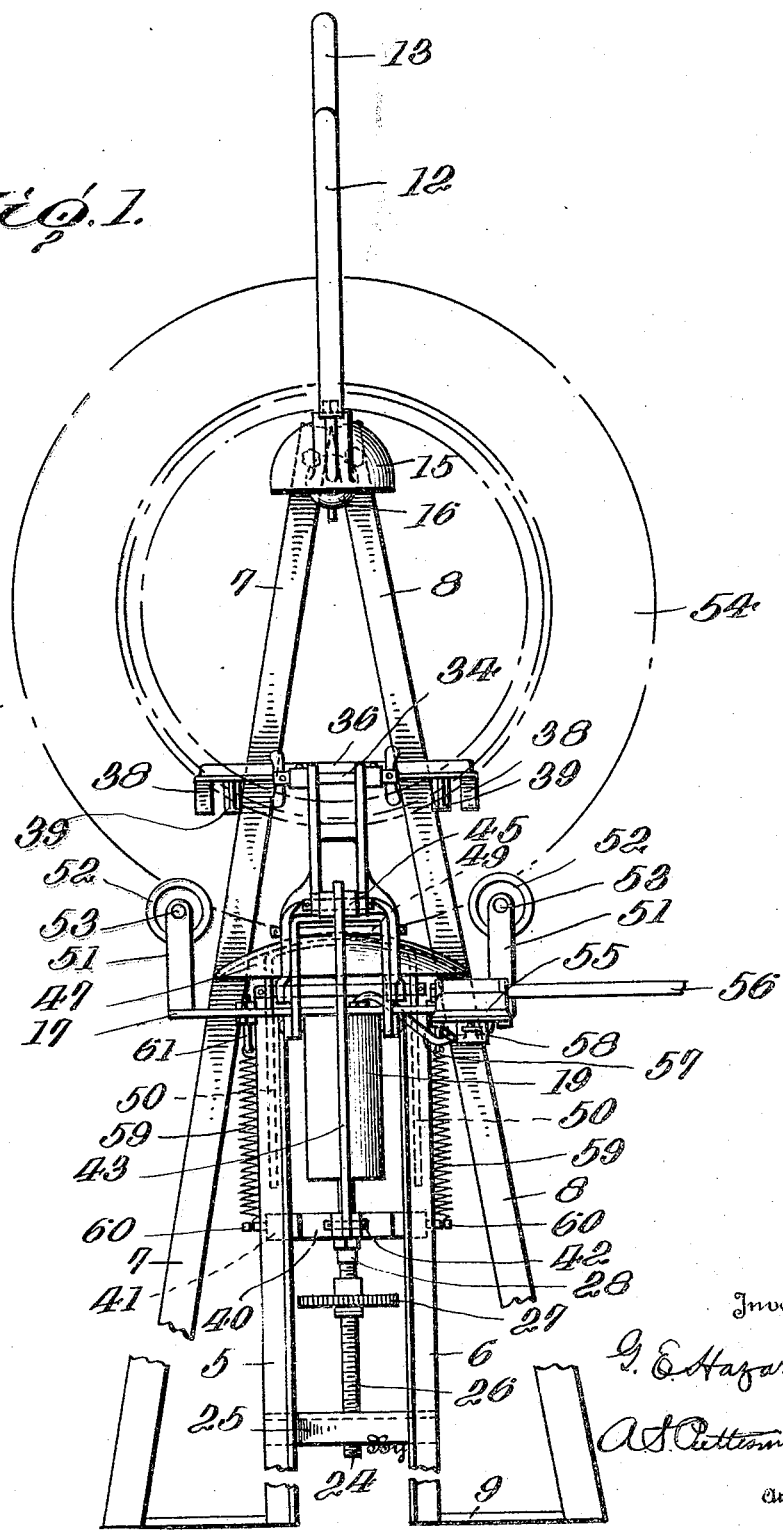

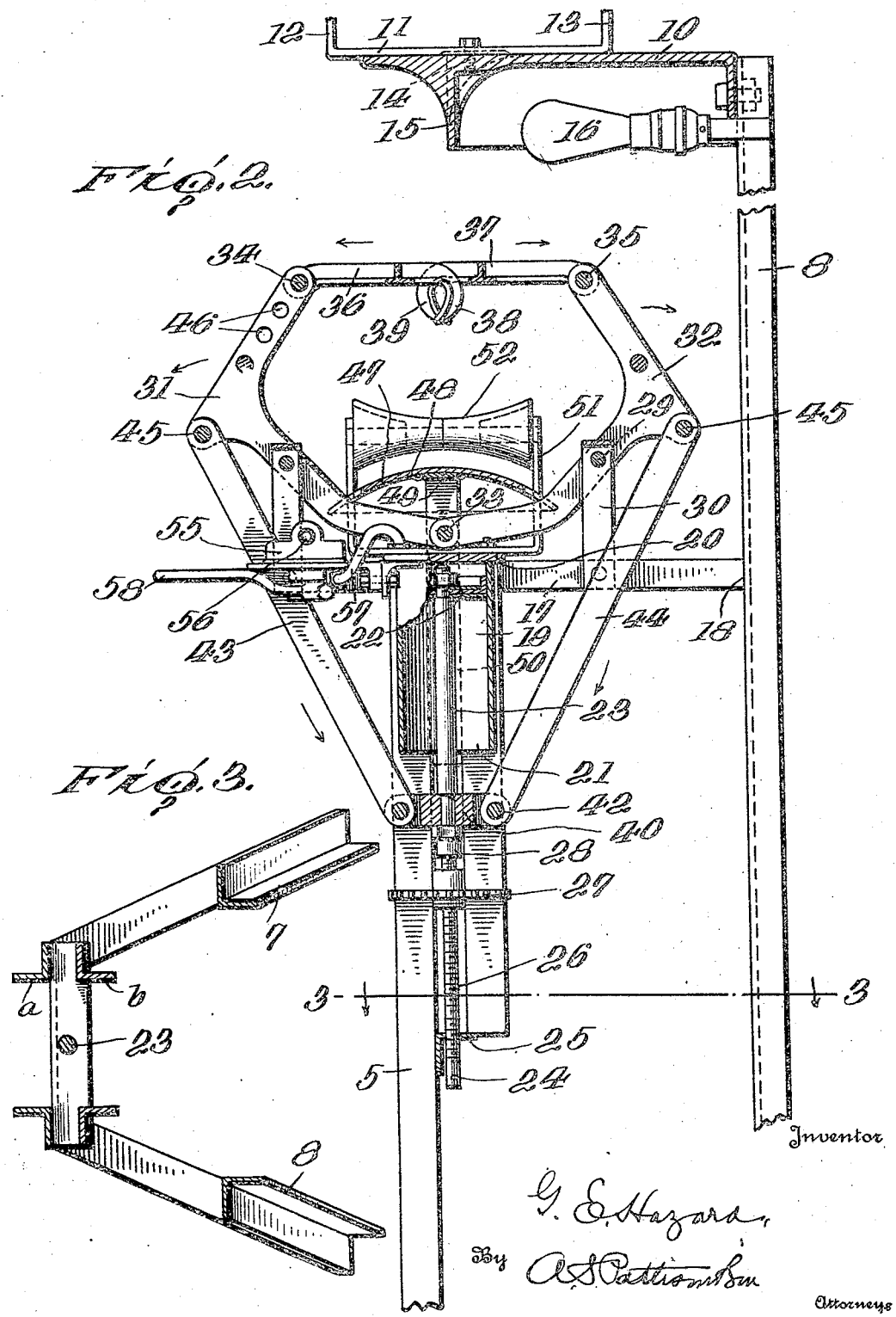

Patented Sept. 20, 1932

1,878,515

UNITED STATES PATENT OFFICE

GEORGE EDGAR HAZARD, OF ROCHESTER, NEW YORK, ASSIGNOR TO KELLOGG MANUFACTURING COMPANY, OF ROCHESTER, NEW YORK

TIRE SPREADER

Application filed January 9, 1928. Serial No. 245,382.

This invention relates to an improvement in a tire spreader and comprises a machine which is adapted to spread a vehicle tire casing so that the casing can be closely inspected, which inspection is a necessary part of a tire repair job.

The primary object of the invention is the provision of a novel tire spreading inspection machine.

A further object of the invention is the provision of a tire spreading and inspection machine the operation of which is through the medium of a liquid pressure.

Another and further object of the invention is the provision of a machine of the character described which is simple and rapid in operation and highly efficient in use.

A still further object of the invention is the provision of a machine of the character described which embodies a plurality of novel features of construction which are set forth in the following description taken in conjunction with the accompanying drawings.

In the drawings:

Figure 1 is a front view of the machine.

Figure 2 is a side view of the machine, a portion of the machine being shown in vertical section so as to better illustrate its construction.

Figure 3 is a transverse horizontal sectional view taken on the line 3—3 of Figure 2 looking in the direction indicated by arrow.

Referring now to the drawings, which illustrate one form embodying the inventive idea of the invention, it will be seen that the machine is supported on a pair of vertical front legs 5 and 6 which legs are in separated parallel relation. Each of the legs is composed of L-shaped angle irons $a$ and $b$ (see Figure 3) which are in separated relation so as to form a space between the two portions forming the legs.

The rear legs of the machine are designated at 7 and 8 and their bottom ends are attached to a base 9 while their upper ends converge to meet at a point considerably above the machine where they support a combined electric light guard and reflector 10.

A U-shaped bracket 11, the vertical legs of which are designated at 12 and 13, is suitably supported upon and attached to the upper side of the guard 10 as at 14. At its front the guard 10 is provided with a depending wall 15 which guards the eyes of the operator of the machine from the glare of the electric light 16. This guard is so shaped as to protect the light from injury and at the same time to reflect all of the light downwardly upon the machine where the work is being done.

The lower ends of the front legs 5 and 6 are attached to the base 9 while the upper ends of the legs support a cross plate or table 17 which table or plate extends rearwardly and has its rear edge attached to the rear legs as at 18.

A cylinder 19 having a closed top 20 and an open lower end 21 is suitably supported and extends downwardly from the cross plate or table 17. This cylinder is provided with a piston 22 and an elongated piston rod 23. The lower end 24 of the piston rod extends through a combined stop and guide plate 25 which is supported between the front legs of the machine. The lower end 24 of the piston rod is threaded as at 26 and carries the rotatable combined hand wheel and adjustable stop 27. The piston rod is further provided with a collar 28, the purpose of which will be later described.

Pivotally supported as at 29 upon suitable brackets 30 are rocker arms 31 and 32 which are of a shape somewhat similar to a bell crank lever. The lower ends of these arms have a common hinge pin 33 while the upper ends of the arms pivotally supported as at 34 and 35 the hook arms 36 and 37 which are of a length to extend past one another at a point central of and above the machine. These hook arms have their overlapping ends formed into what I have termed front hooks 38 and rear hooks 39 which are in separated parallel relation but sufficiently distanced apart to assure that there will be no chance of the front or rear hooks catching together during the operation of the machine.

Attention is directed to the fact that the brackets 30 have their lower ends pivotally supported which allows these brackets to swivel slightly for the purpose of permitting a greater freedom for the placing of the hooks and the operation of the complete mechanism.

A cross slide 40 is carried upon the piston rod above the collar 28 and has sliding contact with the front legs 5 and 6 of the machine which keeps it from tilting. By reference to Figure 1 of the drawings it will be seen that this cross slide has extending ends 41 which slide between the angle iron pieces *a* and *b* which form the front legs of the machine.

Pivotally attached as at 42 to this cross slide are the operating arms 43 and 44 which have their upper ends extending upwardly and outwardly for pivotal connection as at 45 with the rocker arms 31 and 32 intermediate their ends.

An adjustment for the hook arm 36 is provided through the instrumentality of placing a plurality of holes 46 in the upper end of the rocker arm 31. By shifting the pivotal connections 34 to these different holes three different positions of the hook arm may be had.

An arc shaped tire supporting plate 47 is suitably supported as at 48 upon a U-shaped guide 49. This guide 49 has extending legs 50 (see Fig. 1) which slides in and is held in position between the two angle iron pieces *a* and *b* which form the front legs of the machine. This sliding engagement prevents the plate from tipping forward or back while the rocker arm hinge pin 33 which passes through the legs 50 of the guide prevents the plate from tipping sideways.

Rotatably mounted in the upper ends of suitable brackets 51 carried at the ends of the cross plate or table 17 are rollers or pulleys 52. These rollers rotate freely on their axles 53 and permit the rotation of the tire 54 during the operation of the machine.

Air or other suitable liquid pressure is delivered to a valve 55 by a conduit 56 and from the valve 55 is conveyed to the top of the cylinder 19 through a suitable hose or tube 57. A valve control handle 58 is conveniently placed for the hand of the operator of the machine.

For the purpose of returning the piston to its upper position, after it has been forced downwardly through the medium of pressure above the piston, I have provided a pair of coil springs 59 the lower ends of which are suitably attached as at 60 to the cross slide 40 while the upper ends are attached through suitable means shown at 61 to the cross plate or table 17.

Having described the component parts going into the makeup of the machine a short description of the operation will be given.

*Operation*

The parts being in the positions shown in the drawings a tire casing 54 is placed on the machine. It will be seen that the tire is supported upon the rollers 52 and the plate 47 and is prevented from tipping by placing the upper side or top of the tire between the vertical legs 12 and 13 of the bracket 11.

The hooks 38 and 39 are positioned to engage the inner side of the bead of the tire casing and the valve handle 58 actuated to permit the inlet of pressure to the cylinder above the piston. This pressure in the cylinder forces the piston downwardly and through the medium of the operating arms 43, which are carried downwardly by reason of their attachment to the cross slide 40 on the piston rod, the rocker arms 31 and 32 are pulled downwardly upon their pivotal supports 29. The downward pull upon these rocker arms causes the plate 47 to be lifted by reason of the fact that the hinge pin 33 passes through the plate guide 49 and at the same time the hook arms 36 and 37 are pulled outwardly and downwardly.

By reason of the upward movement of the plate 47 and the outward and downward movement of the hook arms the tire casing is virtually turned inside out and permits a careful and minute inspection of the inner side of the entire casing. This inspection of the casing can be obtained at night as well as in the day time by reason of the electric light 16.

After the portion of the casing which has been spread has been inspected the operating handle of the valve 55 is positioned to permit the escape of pressure from the cylinder and the parts are carried back to their normal positions, as shown in the drawings through the upward pull of the coil springs 59. The tire casing can then be revolved upon the rollers 52 and the operation of the machine repeated so as to inspect another portion of the casing.

These operations are repeated a sufficient number of times to inspect the whole interior area and circumference of the casing.

Tires of certain sizes should not be over stretched, as to do so would tend to injure them. For this reason the adjustable hand wheel and stop 27 is provided. This wheel is positioned on the threaded extension of the piston rod so that upon the downward movement of the piston and piston rod it will engage the guide plate 25 at a time when the maximum stretching and spreading of the tire has been reached.

Having thus described my invention, what I desire to claim and secure by Letters Patent is:

1. A tire spreader comprising a standard carrying a table, rocker arms pivotally supported above said table, tire casing engaging and spreading means pivotally connected to the upper ends of said rocker arms, a tire casing supporting plate and guide therefor pivotally connected to the lower ends of said rocker arms, a cylinder and piston therefor, operating arms pivotally connected to said rocker arms and to said piston, and means to drive said piston downwardly to cause said operating arms to rotate the rocker arms upon their pivotal supports, for the purpose described.

2. A tire spreader comprising a table having front and back legs, a tire casing supporting and positioning bracket carried upon the rear legs of said table, rocker arms pivotally supported above the table proper and provided with tire casing engaging and spreading means, a casing supporting plate having a guide slidable between the front legs of said table and having pivotal connection with the lower ends of said rocker arms, a cylinder having therein a piston provided with an elongated piston rod, a combined guide and stop for said piston rod, an adjustable stop mounted upon said piston rod, operating arms pivotally connecting the piston rod and the rocker arms, means for driving the said piston and piston rod downwardly, and separate means for returning the piston and piston rod to its upper position.

3. A tire spreader comprising a standard having mounted thereon rotatable members to support a tire casing, a pressure operated cylinder and piston, a pair of rocker arms rotatably supported above said standard and having tire casing engaging means positioned above said rollers, a casing supporting plate positioned intermediate said rollers and provided with a guide having pivotal connection with said rocker arms, operative connection between said rocker arms and said piston, and means to drive said piston downwardly to rotate the rocker arms upon their pivotal support, whereby said tire engaging means exert an outward and downward pull upon the sides of the tire casing and the supporting plate is lifted upwardly against the casing bottom.

4. A tire spreader comprising a table having front and back legs, each of the front legs of said table composed of two pieces of angle iron in spaced parallel relation, a tire casing supporting and positioning bracket carried by the rear legs of said table at a point above the table, rocker arms pivotally supported above the table and provided with tire casing engaging and spreading means, a casing supporting plate having a guide slidable between the angle iron pieces of the front legs and having pivotal connection with the lower ends of said rocker arms, a cylinder having therein a piston provided with an elongated piston rod, a guide for the lower end of said piston rod, an adjustable stop mounted upon said piston rod and adapted to engage said piston rod guide, a cross slide carried by said piston rod and slidable between the angle iron pieces of the front legs of the table, operating arms pivotally connected to said guide and to said rocker arms, means to drive said piston and piston rod downwardly and to rotate said rocker arms upon their pivotal support, and separate means to return said piston and piston rod to their elevated positions.

5. A tire spreader comprising a table having front and back legs, each of the front legs of the said table composed of two pieces of angle iron in spaced parallel relation, the rear legs of said table converging and meeting at a point above the table and carrying a tire casing supporting and positioning bracket, brackets mounted upon said table at opposite sides thereof, rocker arms pivotally supported upon said brackets, said rocker arms extending upwardly and outwardly and then upwardly and inwardly and pivotally supporting at their upper ends, tire casing engaging and spreading means, a casing supporting plate having a guide slidable between the angle iron pieces of the front legs, said rocker arms having downwardly and inwardly extending ends from their pivotal support, said ends extending to a point beneath the tire supporting plate, said tire supporting plate having a part pivotally connected to the lower ends of the said rocker arms, a cylinder having therein a piston provided with an elongated piston rod, said cylinder positioned beneath the table, a guide for the lower end of said piston rod, an adjustable stop mounted upon said piston rod and adapted to engage said piston rod guide, a cross slide carried by said piston rod and slidable between the angle iron pieces of the front legs of the table, operating arms pivotally connected to the said guide and said rocker arms, means to drive said piston and piston rod downwardly to rotate said rocker arms upon their pivotal support and separate means to return said piston and piston rod to their elevated positions when desired.

6. A tire spreader comprising a table having supporting legs, one pair of supporting legs of said table composed of angle-iron with the legs in spaced parallel relation, rocker arms pivotally supported upon said table at opposite sides thereof, said rocker arms extending upwardly and outwardly and then inwardly and having pivotally supported upon their upper ends a tire casing engaging and spreading means, a casing supporting plate having guiding means slidable between the angle-iron pieces of said angle iron legs, said rocker arms having downwardly and inwardly extending ends from their pivotal supports and said ends extending to a point beneath the tire supporting plate, said tire supporting plate pivotally connected to the lower ends of said rocker arms, a motor having therein a piston provided with an elongated piston rod, operating arms pivotally connecting the piston rod and the rocker arms, and means to operate said piston and piston rod to rotate said rocker arms upon their pivotal support, for the purpose described.

In testimony whereof I hereunto affix my signature.

GEORGE EDGAR HAZARD.